US009953263B2

(12) United States Patent
Laborie et al.

(10) Patent No.: US 9,953,263 B2
(45) Date of Patent: Apr. 24, 2018

(54) PERFORMANCE COMPARISON FOR DETERMINING A TRAVEL PATH FOR A ROBOT

(71) Applicant: INTERNATIONAL BUSINESS MACHINES CORPORATION, Armonk, NY (US)

(72) Inventors: Philippe Laborie, L'Hay-les-Roses (FR); Olivier M. D. Lhomme, Cagnes-sur-Mer (FR); Olivier Oudot, Vallauris (FR); Paul Shaw, Grasse (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/041,081

(22) Filed: Feb. 11, 2016

(65) Prior Publication Data

US 2017/0236061 A1    Aug. 17, 2017

(51) Int. Cl.
| | |
|---|---|
| G06F 17/00 | (2006.01) |
| G06N 5/02 | (2006.01) |
| G06F 9/455 | (2018.01) |
| G06F 9/50 | (2006.01) |

(52) U.S. Cl.
CPC ......... G06N 5/022 (2013.01); G06F 9/45558 (2013.01); G06F 9/5072 (2013.01)

(58) Field of Classification Search
CPC . G06N 5/022; G06N 99/005; G06F 9/454558
USPC ................................... 706/12, 15, 45, 46, 47
See application file for complete search history.

(56) References Cited

U.S. PATENT DOCUMENTS

| | | | | |
|---|---|---|---|---|
| 5,986,999 | A * | 11/1999 | Takahashi | .......... G11B 7/08517 369/124.13 |
| 6,195,774 | B1 * | 2/2001 | Jacobson | ....... G01B 31/318591 714/725 |
| 6,286,764 | B1 * | 9/2001 | Garvey | ................ G05D 7/0635 236/12.12 |
| 7,451,173 | B1 | 11/2008 | Van Benthem et al. | |
| 7,672,815 | B2 | 3/2010 | Asgari et al. | |
| 7,996,344 | B1 | 8/2011 | Goel | |
| RE42,999 | E | 12/2011 | LeClerc et al. | |
| 8,195,496 | B2 | 6/2012 | Gottlieb et al. | |
| 2002/0188618 | A1 * | 12/2002 | Ma | ........................ G06T 11/206 |

(Continued)

OTHER PUBLICATIONS

Antich, "A Bug-Inspired Algorithm for Efficient Anytime Path Planning", Dec. 15, 2009, IEEE.*

(Continued)

*Primary Examiner* — David R Vincent
(74) *Attorney, Agent, or Firm* — Samuel A. Waldbaum

(57) ABSTRACT

This invention relates to a system, method and computer program product for determining which anytime technique is the most efficient at solving an anytime problem using a first anytime technique and a second anytime technique to determine a first and a second plurality of solutions, respectively, wherein each of the first and the second the plurality of solutions includes a value and an associated computation time, respectively, and each of the first and the second plurality solutions including a minimized value and associated computation time, respectively. Determining a set of delta value ordinates and computation time ordinates. Determining a representative value ordinate and representative computation time ordinate. Determining an efficient anytime technique.

11 Claims, 10 Drawing Sheets

(56) References Cited

U.S. PATENT DOCUMENTS

| | | | | |
|---|---|---|---|---|
| 2004/0267680 | A1* | 12/2004 | Fromherz | G05B 13/021 706/19 |
| 2005/0028160 | A1* | 2/2005 | Cofer | G06F 9/4881 718/100 |
| 2012/0121130 | A1* | 5/2012 | Kaminka | G06K 9/4671 382/103 |
| 2017/0140278 | A1* | 5/2017 | Gupta | G06N 5/04 |

OTHER PUBLICATIONS

Lucas, "Development of a Multi-resolution Parallel Genetic Algorithm for Autonomous Robotic Path Planning", 2012, International Conference on Control, Automation and Systems.*

Likhachev, "Anytime Dynamic A: An Anytime, Replanning Algorithm", 2005, AAAI.*

Likhachev, "ARA: Anytime A with Provable Bounds on Sub-Optimality", 2004, Carnegie Mellon University.*

Arismendi, "Smooth Anytime Motion Planning using Fast Marching", 2013, University of Madrid.*

Narayanan, "Anytime Safe Interval Path Planning for Dynamic Environments", 2012, International Conference on Intelligent Robots and Systems.*

Luna, "Anytime Solution Optimization for Sampling-Based Motion Planning", 2013, International Conference on Robotics and Automation (ICRA).*

IBM, "IBM ILOG CPLEX Optimization Studio," IBM developerWorks Community, https://www.ibm.com/developerworks/downloads/ws/ilogcplex/, Printed on Jan. 14, 2016, pp. 1-2.

Gogos et al., "An improved multi-staged algorithmic process for the solution of the examination timetabling problem," Annals of Operations Research, Apr. 2012, vol. 194, Issue 1, Published online: Feb. 19, 2010, pp. 203-221.

Civicioglu et al., "A conceptual comparison of the Cuckoo-search, particle swarm optimization, differential evolution and artificial bee colony algorithms," Artificial Intelligence Review, Apr. 2013, vol. 39, Issue 4, Published online: Jul. 6, 2011, pp. 315-346.

Wikipedia, "Anytime algorithm," Wikipedia, the free encyclopedia, https://en.wikipedia.org/wiki/Anytime_algorithm, Printed on Jan. 14, 2016, pp. 1-3.

Mell et al., "The NIST Definition of Cloud Computing," National Institute of Standards and Technology U.S. Department of Commerce, Special Publication 800-145, Sep. 2011, pp. 1-7.

Dolan et al., "Benchmarking optimization software with performance profiles," Math. Program., Ser. A 91, 2002, Digital Object Identifier (DOI) 10.1007/s101070100263, Published online Oct. 2, 2001—Springer-Verlag 2001, pp. 201-213.

Neumaier et al., "A comparison of complete global optimization solvers," Math. Program., Ser. B 103, 2005, Digital Object Identifier (DOI) 10.1007/s10107-005-0585-4, Published online May 6, 2005—Springer-Verlag 2005, pp. 335-356.

Lastusilta et al., "Comparison of Some High-Performance MINLP Solvers," Chemical Engineering Transactions, vol. 11, 2007, pp. 1-7.

* cited by examiner

FIG. 6

| Anytime Technique A | | Anytime Technique B | | Deltas | | Centroid Deltas | |
|---|---|---|---|---|---|---|---|
| Time $T(S_A)$ | Value $V(S_A)$ | Time $T(S_B)$ | Value $V(S_B)$ | Time $T(S_A)-T(S_B)$ | Value $V(S_A)-V(S_B)$ | Time $Sum(T(S_A)-T(S_B))/n$ | Value $Sum(V(S_A)-V(S_B))/n$ |
| 21.0 | 88.0 | 18.2 | 91.1 | 2.8 | -3.1 | 2.68 | -0.93 |
| 25.0 | 76.0 | 23.9 | 76.6 | 1.1 | -0.6 | | |
| 21.0 | 90.0 | 25.1 | 90.7 | -4.1 | -0.7 | | |
| 18.0 | 72.0 | 19.5 | 73.7 | -1.5 | -1.7 | | |
| 14.0 | 68.0 | 9.6 | 64.4 | 4.4 | 3.6 | | |
| 35.0 | 88.0 | 31.9 | 85.3 | 3.1 | 2.7 | | |
| 39.0 | 73.0 | 33.7 | 76.2 | 5.3 | -3.2 | | |
| 25.0 | 65.0 | 21.5 | 67.4 | 3.5 | -2.4 | | |
| 30.0 | 85.0 | 23.2 | 88.8 | 6.8 | -3.8 | | |
| 15.0 | 74.0 | 9.6 | 74.1 | 5.4 | -0.1 | | |

PERFORMANCE COMPARISON FOR DETERMINING A TRAVEL PATH FOR A ROBOT

BACKGROUND

The present invention relates generally to an environment of performance comparison of a problem solving system that can use two or more optimization techniques.

Contrary to a standard optimization technique where no result is available until the ending of an optimization method, an anytime technique can be stopped at any time to provide a solution of increasing quality over time. An anytime technique is expected to find better solutions the longer it executes. A constraint programming optimization engine uses an anytime technique to find optimal solutions to combinatorial problems (also known as models) expressed in a mathematical language. A problem is expressed as a model that specifies three pieces of information: the unknowns of the problem (variables in the model); the constraints/laws/rules of the problem (constraints between variables in the model); and what is to be optimized (the objective function in the model).

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for determining which anytime technique is the most efficient at solving an anytime problem using a first anytime technique and a second anytime technique to determine a first and a second plurality of solutions, respectively, wherein each of the first and the second the plurality of solutions includes a value and an associated computation time, respectively, and each of the first and the second plurality solutions including a minimized value and associated computation time, respectively. Determining a set of delta value ordinates and computation time ordinates where each delta value ordinate is the difference between a value from the first plurality of solutions and a value from the second plurality of solutions and where each delta computation time ordinate is the difference between an associated computation time from the first plurality of solutions and an associated computation time from the second plurality of solutions. Determining a representative value ordinate and representative computation time ordinate from a summation of the respective delta value and computation time ordinates. Determining an efficient anytime technique from the sign of the representative value ordinate and representative computation time ordinates.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 is an example comprising a table of two runs, each run comprising ten ordinates, in accordance with an embodiment of the present invention.

DETAILED DESCRIPTION

Figure 1:
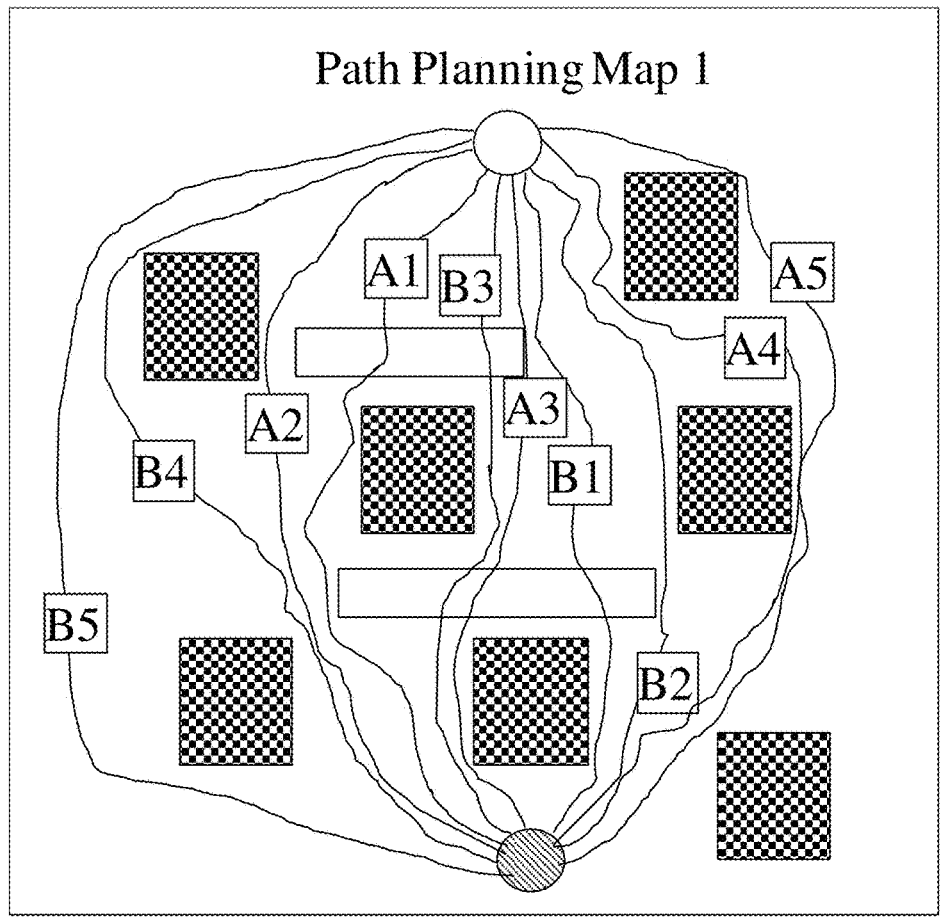
FIG. 1 is an example path planning map and an example map key, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout.

FIG. 1 is an example path planning map and an example map key, in accordance with an embodiment of the present invention.

Anytime problems comprise the following characteristics: problems are usually non-deterministic polynomial complete (NP-complete) meaning that solve time is potentially exponential and that finding an optimal solution is often impossible to complete in a reasonable time. A solution to an anytime problem is a compromise between: exploring as many solutions as possible; and finding the solution that provides the best results.

Path planning is just an example of an anytime problem that is used to illustrate the invention; other examples could include: travelling salesman problems; chess problems; partition problems or any problem that is NP-complete.

FIG. 1 illustrates a path planning map 1 which represents a map of a terrain that a robot is intending to traverse. The composition of terrain is an unknown part of the problem until discovered by the robot or virtual robot. The terrain can be empty and low cost for movement, obstructed (for example containing an immovable obstacle), or challenging (for example uneven ground or water having a high cost for movement). The constraints are the obstacles and the cost of traversing from start to finish is required to be minimized. A diagonal hash filled circle represents start 3. A white filled circle represents finish 4. Each check filled rectangle shape represents an obstacle 5 in the terrain that the robot must avoid. Each white filled rectangle represents high cost terrain 6 that has an extra cost for the robot to traversing over. A1 to A5 are paths discovered by anytime technique A. B1 to B5 are paths discovered by anytime technique B. A2 probably has a lower cost than A1, A3, A4 and A5 because it is one of the shortest distances and does not traverse a high cost area. Similarly B2 probably has a lower cost than B1, B3, B4 and B5 because it is one of the shortest distances and does not traverse a high cost area. The embodiments seek to determine which anytime technique A or B is the most efficient.

Figure 2A:
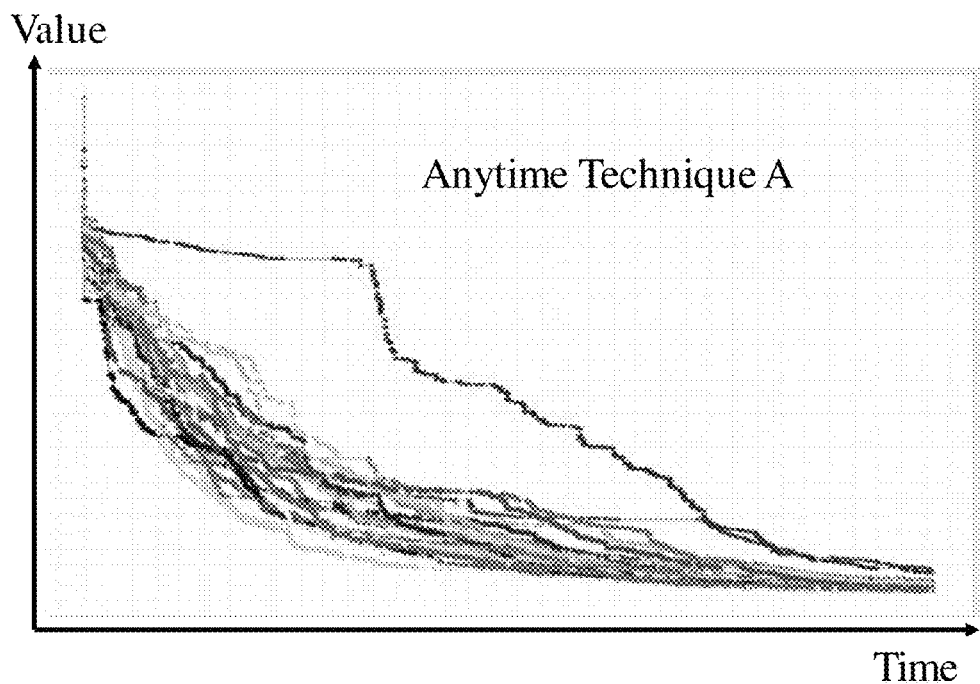
FIGS. 2A & 2B are exemplar XY graphs of multiple solution runs necessary to reduce effect of randomness are shown, in accordance with an embodiment of the present invention.
Figure 2B:
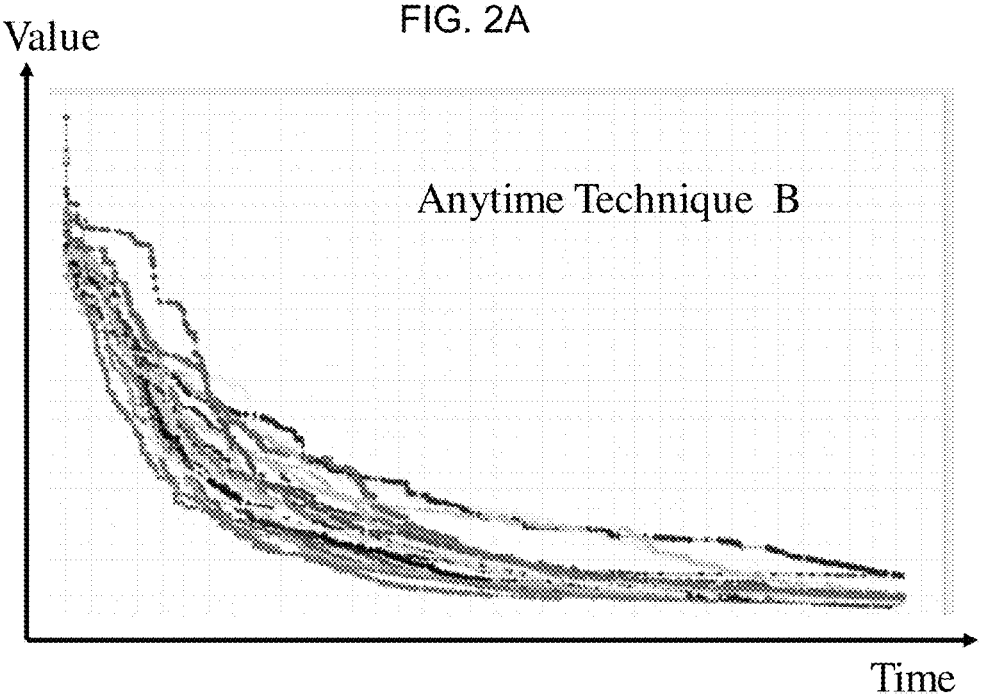

FIG. 2A illustrates solutions of anytime technique A and FIG. 2B illustrates solutions of anytime technique B. The Y axes show a value representing a solution to the algorithms (for example cost of movement from start to finish on a path) and the X axes show computational time that the techniques have been running. FIG. 1 shows several solutions for each anytime technique in terrain space, FIGS. 2A and 2B show multiple solutions in value time space.

Figure 3:
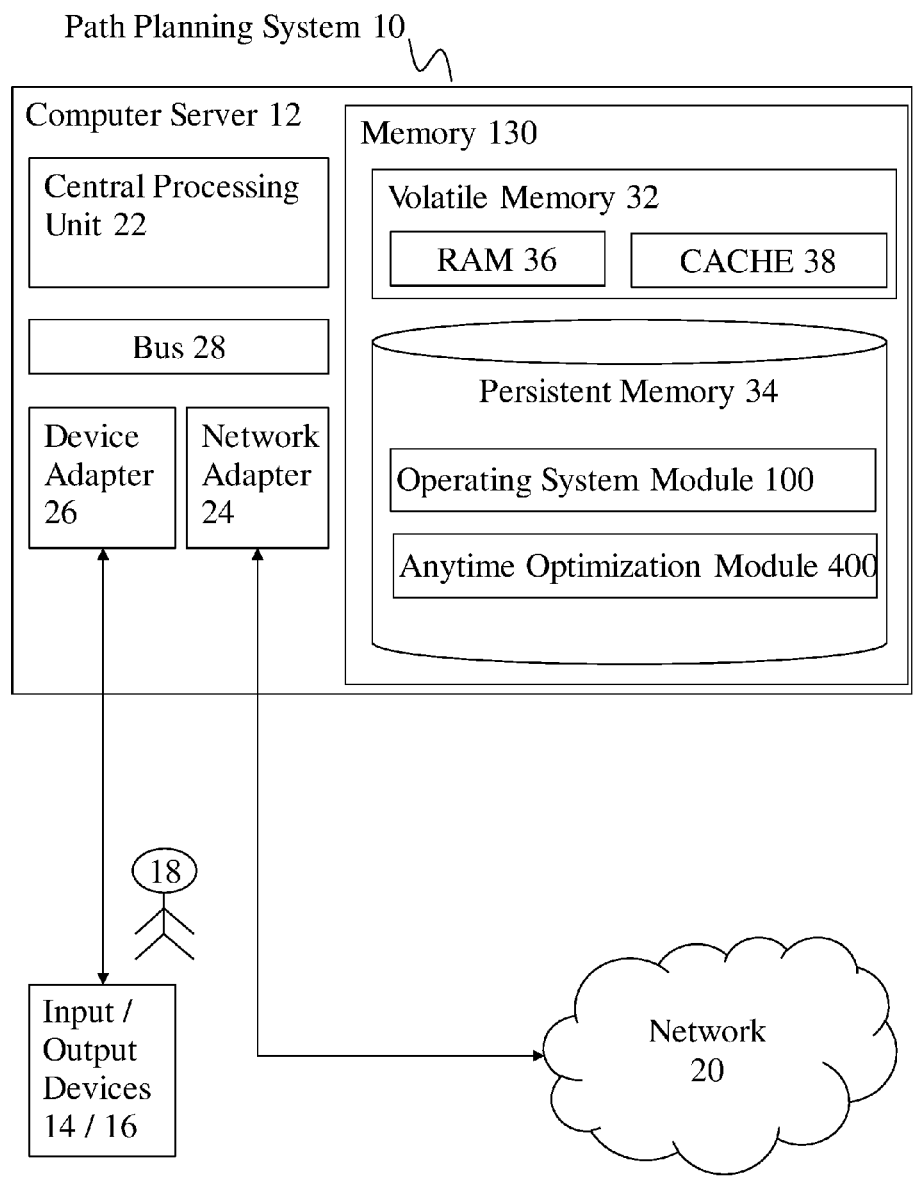
FIG. 3 is a deployment diagram of an in path planning system, in accordance with an embodiment of the present invention.

FIG. 3 is a deployment diagram of an in a path planning system 100, in accordance with an embodiment of the present invention. Path planning system 100 is just an example of a use of anytime techniques used to illustrate the invention and other applications. Path planning system 100 is operational with numerous other general purpose or special purpose computing system environments or configurations. Examples of computing processing systems, environments, and/or configurations that may be suitable for use with path planning system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment, for example, where computer processing systems are distributed as a network 200 of objects that can interact with a computing service.

Figure 9:
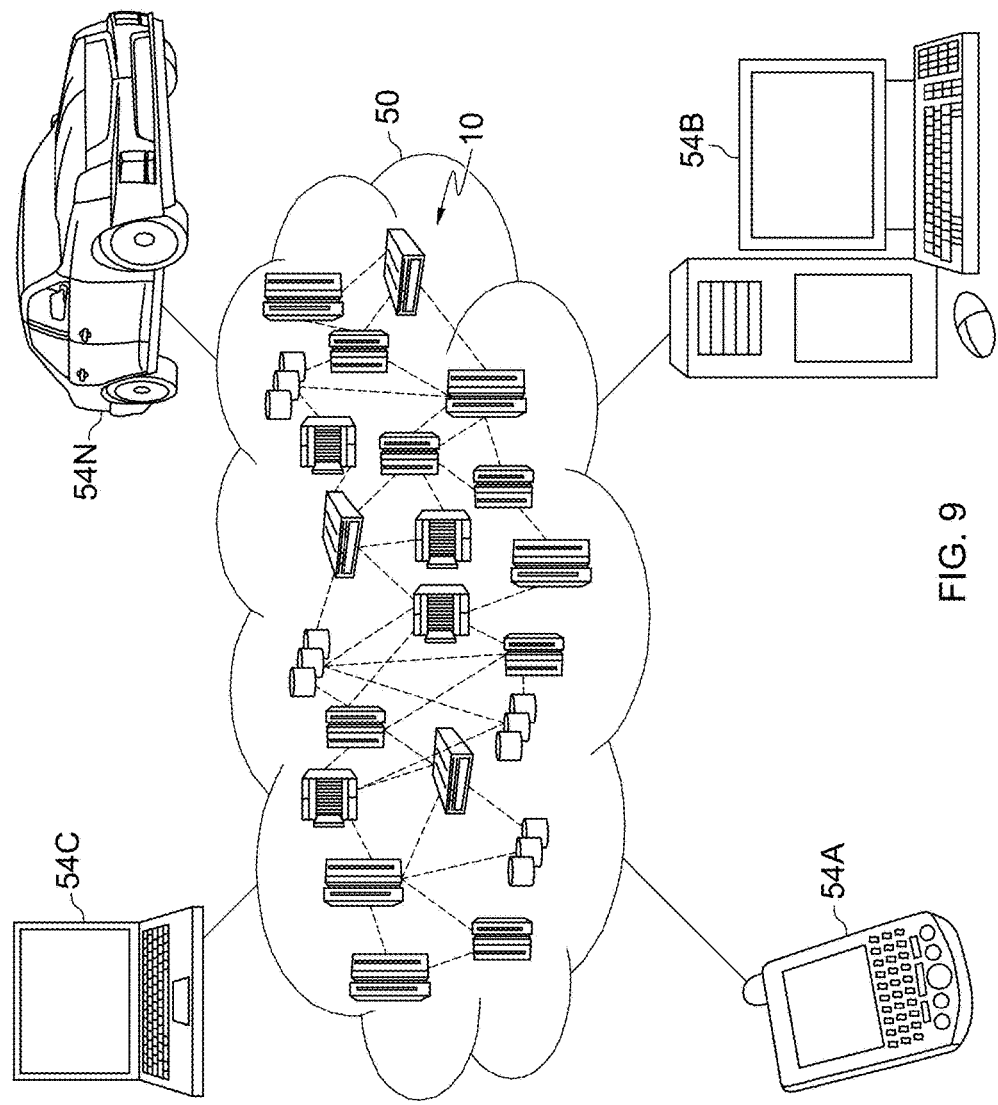
FIG. 9 depicts a cloud computing environment according to an embodiment of the present invention.
Figure 10:
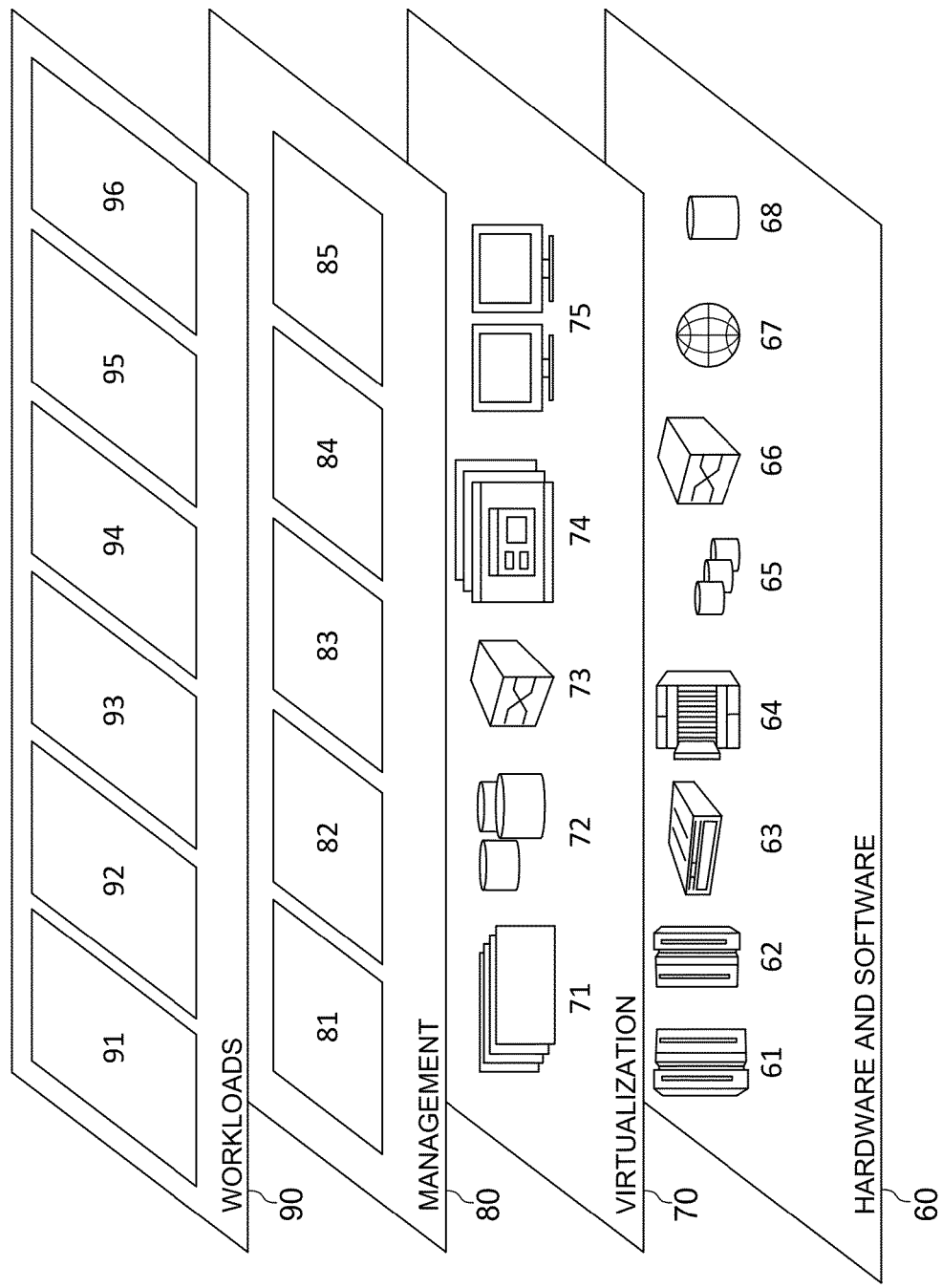
FIG. 10 depicts abstraction model layers according to an embodiment of the present invention.

Path planning system 100 may be described in the context of computer system executable instructions, such as program modules, being executed by a computer processor. A program modules may include: routines, programs, objects, components, logic, and data structures that perform particular tasks or implement particular abstract data types. Path planning system 100 may be embodied in distributed cloud computing environments where tasks are performed by remote processing devices that are linked through a communications network 200. In a distributed cloud computing environment, program modules may be located in both local and remote computer system storage media including memory storage devices. In other embodiments, the path planning system 100 may operate in a cloud computing environment, as depicted in FIGS. 9 and 10.

Path planning system 100 includes a computer server 120 and one or more input devices 114 and output devices 116 directly attached to the computer server 120. Path planning system 100 is connected to a network 200. Path planning system 100 communicates with a user 118 using input devices 114 and output devices 116. Input devices 114 include one or more of a keyboard, a scanner, and a mouse or another pointing device (not shown). Output devices 116 include one or more of a display or a printer (not shown). Path planning system 100 communicates with network devices (not shown) over network 200. Network 200 can be a local area network (LAN), a wide area network (WAN), or the Internet.

Computer server 120 includes a central processing unit (CPU) 122, a network adapter 124, a device adapter 126, a bus 128, and a memory 130.

CPU 122 loads machine instructions from memory 130 and performs machine operations in response to the instructions. Such machine operations includes incrementing or decrementing a value in a register, transferring a value from memory 130 to a register or vice versa, branching to a different location in memory if a condition is true or false (also known as a conditional branch instruction), and adding or subtracting the values in two different registers and loading the result in another register. CPU 122 can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 124 is connected to bus 128 and network 200 for enabling communication between the computer server 120 and network devices (not shown). Device adapter 126 is connected to bus 128 and input devices 114 and output devices 116 for enabling communication between computer server 120 and input devices 114 and output devices 116.

Bus 128 couples the main system components together including memory 130 to CPU 122.

Memory 130 includes computer system readable media in the form of volatile memory 132 and non-volatile or persistent memory 134. Examples of volatile memory 132 are random access memory (RAM) 136 and cache memory 138. Examples of persistent memory 134 are read only memory (ROM) and erasable programmable read only memory (EPROM). Generally volatile memory is used because it is faster and generally non-volatile memory is used because it will hold the data for longer. Path planning system 100 may further include other removable and/or non-removable, volatile and/or non-volatile computer system storage media. By way of example only, persistent memory 134 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 128 by one or more data media interfaces. As will be further depicted and described below, memory 130 may include at least one program product having a set (for example, at least one) of program modules that are configured to carry out the functions of embodiments of the invention.

The set of program modules configured to carry out the functions of the preferred embodiment comprises operating system module 300 and anytime optimization module 400. In one embodiment, ROM in the memory 130 stores the modules enables the computer server 120 to function as a special purpose computer specific to the embodiments. Further program modules that support the preferred embodiment but are not shown include firmware, boot strap program, and support applications. Each of the operating system; support applications; other program modules; and program data; or some combination thereof; may include an implementation of a networking environment.

Path planning system 100 communicates with at least one network 200 (such as a local area network (LAN), a general wide area network (WAN), and/or a public network like the Internet) via network adapter 124. Network adapter 124 communicates with the other components of computer server 120 via bus 128. It should be understood that although not shown, other hardware and/or software components could be used in conjunction with path planning system 100. Examples, include, but are not limited to: microcode, device drivers, redundant processing units, external disk drive arrays, redundant array of independent disks (RAID), tape drives, and data archival storage systems.

Figure 4:
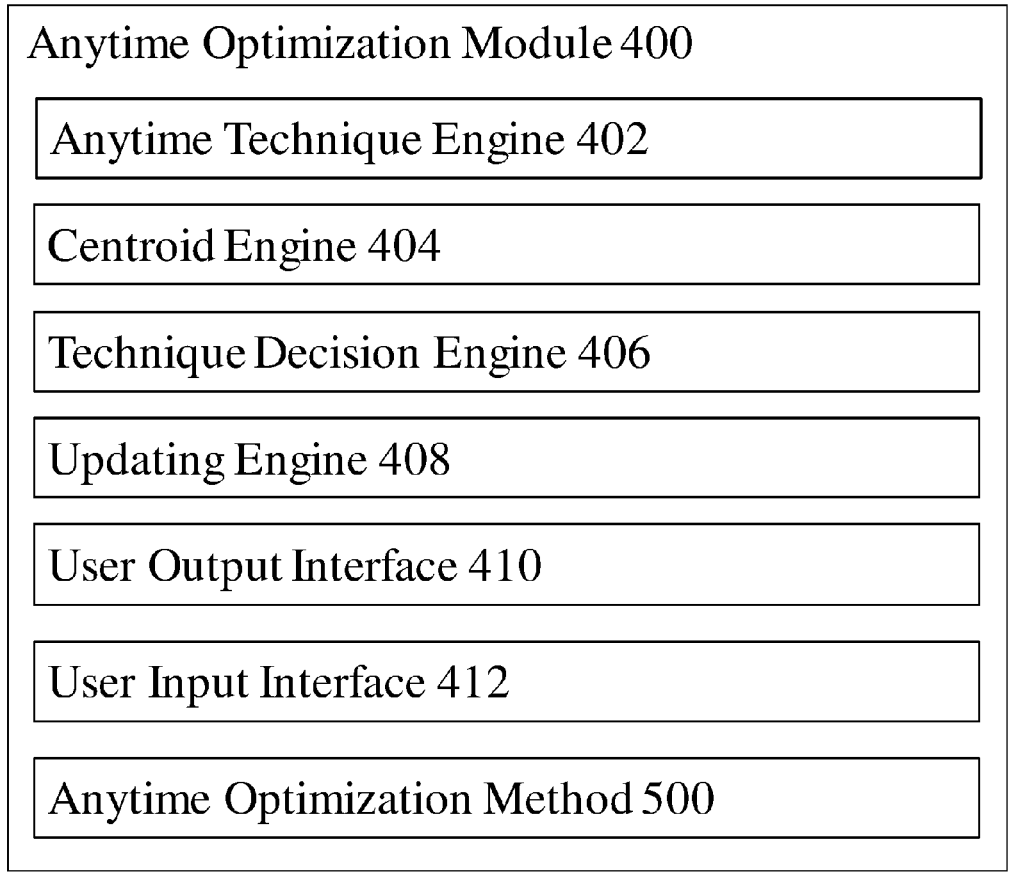
FIG. 4 is a component diagram for an anytime optimization module, in accordance with an embodiment of the present invention.

FIG. 4 is a component diagram for an anytime optimization module 400, in accordance with an embodiment of the present invention. The anytime optimization module 400 includes an anytime technique engine 402, a centroid engine 404, a technique decision engine 406, an updating engine 408, an user output interface 410, an user input interface 412, and an anytime optimization method 500.

Anytime technique engine 402 is for solving an anytime problem using a first anytime technique, for example, anytime technique A, and a second anytime technique, for example, anytime technique B, to determine respective first and second plurality of unique solutions whereby each solution includes a value and a computation time and each plurality of solutions includes a minimized value and associated computation time. Anytime technique engine 402 is further for randomizing the order of the first or second run. In the preferred embodiment solving the problem using a first anytime technique and second anytime technique is performed in the same processor although different threads may be used. In an alternative embodiment, solving the problem using a first anytime technique is performed in a first processor and solving the problem using a second anytime technique is performed in a second processor to benefit from parallel processing as further described in relation to FIG. 8. Once an anytime technique has been chosen as the most efficient then the anytime technique engine 402 can be adapted to focus computing power on the problem using this single anytime technique.

Centroid engine 404 is for determining a set of delta value ordinates and computation time ordinates where each delta value ordinate is the difference between a value from the first plurality of solutions and a value from the second plurality of solutions and where each delta computation time ordinate is the difference between an associated computation time from the first plurality of solutions and an associated computation time from the second plurality of solutions. Centroid engine 404 is also for determining a representative value ordinate and representative computation time ordinate from a summation of the respective delta value ordinates and computation time ordinates. In the preferred embodiment centroid engine 404 is for calculating centroid ordinates in value and computation time space by summing the delta ordinates and dividing by the number of delta ordinates.

Technique decision engine 406 is for determining a more efficient anytime technique from the sign and magnitude of representative value and computation time ordinates. Technique decision engine 406 is further for determining, that if the delta ordinates summation are both positive and both negative, then the technique responsible for the all positive or all negative delta ordinates summation is the most efficient. Technique decision engine 406 is further for determining, that if the summations of the delta ordinates are mixed positive and negative then the technique responsible for the ordinate with the largest normalized magnitude is determined as the most efficient.

Updating engine 408 is for updating the anytime technique engine 402 to use only the determined most efficient anytime technique.

User output interface 410 is for displaying a scatter plot of the first and second runs of values and computation time.

User input interface 412 is for accepting user input as to which anytime technique is the most efficient.

Figure 5:
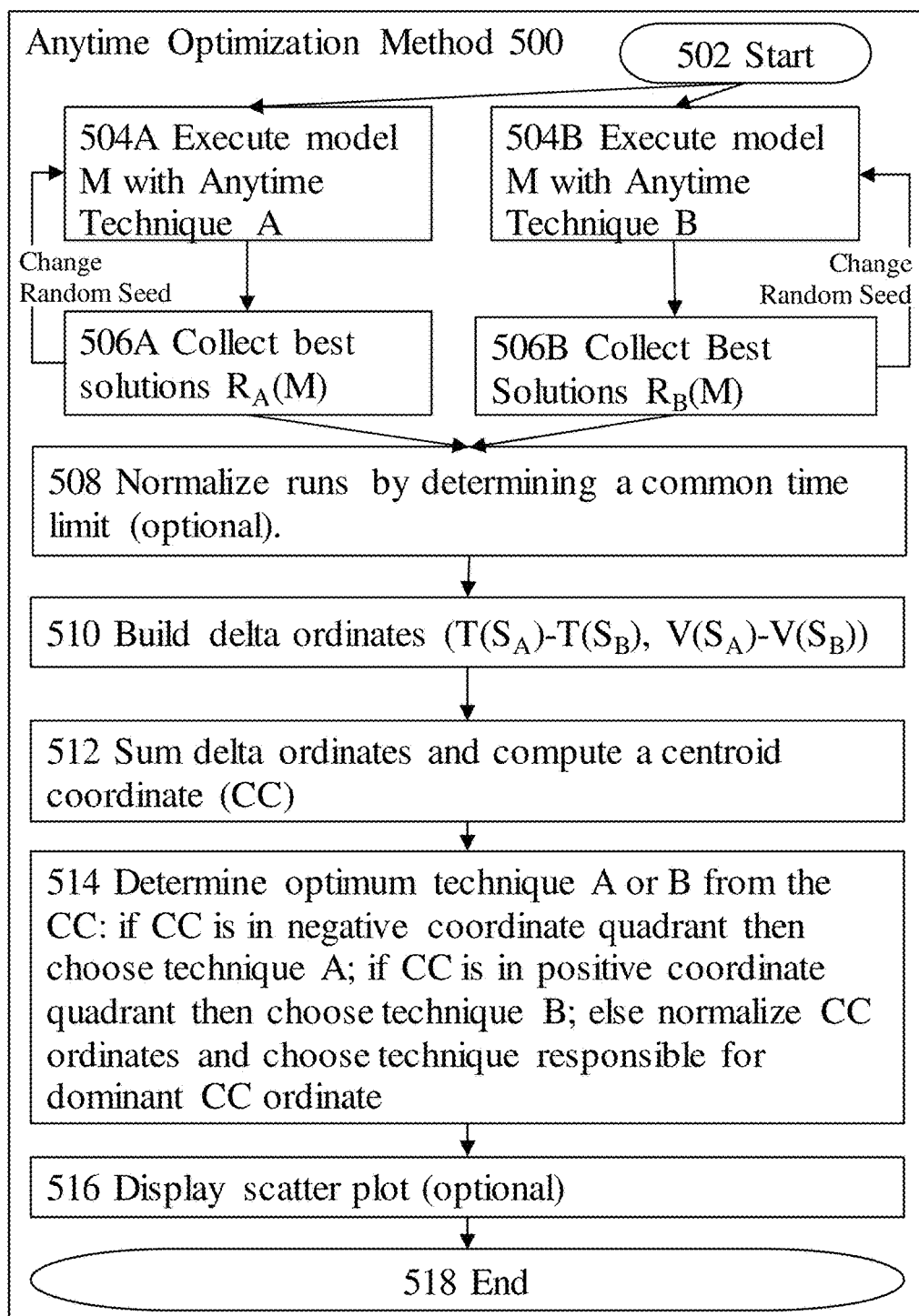
FIG. 5 is a flow diagram of an anytime optimization method, in accordance with an embodiment of the present invention.

Referring to FIG. 5, preferred embodiment anytime optimization method 500 comprises logical process.

The start of anytime optimization method 500 for optimizing a problem solving system using more than one anytime technique to solve a constrained problem, for example, which path a robot should travel, initiated by a user or by another system (502). Initially the process splits into two separate streams A and B to process the two separate anytime techniques A and B (also referred to as first and second anytime techniques).

Executing model M using anytime technique A to solve the problem thereby producing a solution including a run of minimized values and computation times (504A). Value V ($S_A$) and computation time T ($S_A$) represent the minimum value and associated computation time of each run.

Executing model M using anytime technique B to solve the problem thereby producing a solution including a minimized value V ($S_B$) and associated computation time T ($S_B$) (504B). Executing model M using anytime technique A and executing model M using anytime technique B may be executed in either series or parallel. Value V ($S_B$) and computation time T ($S_B$) represent the minimum value and associated computation time of each run.

Compiling minimized values V ($S_A$) and associated computation times T ($S_A$) into a run $R_A$ (M) of minimized values and associated computation times by iteratively looping back to step 504A and allowing execution of anytime technique A over a range of computation times (506A). Each time the process loops back to step 504A, a random seed is changed so that the model M is solved differently for each loop back. For instance in the preferred embodiment the starting position of the robot and initial direction of the path might be different each time to achieve a different solution each time. The solutions may be better or worse than previously. A large number of iterations helps to reduce the impact of the randomness of the solutions. Together steps 504A and 506A solve the problem using a first anytime technique A to determine a first plurality of unique solutions whereby each solution includes a value and a computation time and each plurality of solutions including a minimized value and associated computation time.

Compiling minimized values V(S$_B$) and computation times T(S$_B$) into a run R$_B$(M) of minimized values and associated computation times by iteratively looping back to step 504B and allowing execution of anytime technique B over a range of computation times (506B). Each time the process loops back to step 504B, a random seed is changed so that the model M is solved differently each loop back. Together steps 504B and 506B solve the problem using a second anytime technique B to determine a second plurality of unique solutions whereby each solution includes a value and a computation time and each plurality of solutions including a minimized value and associated computation time.

Optionally one or more of R$_A$ (M) or R$_B$ (M) has the order of minimized values and computation times randomized.

For each anytime technique A and B the model is solved multiple times and a random generator seed is changed for each run. The best solution S of a run is generally the last solution of this run.

Normalizing runs, for example, by determining a common time limit to find a minimum value or not (508). This step is optional.

Building delta ordinates from the first and second runs, for example according to the following equation (1) (510):

$$\Delta T, \Delta V = T(S_A) - T(S_B), V(S_A) - V(S_B) \quad (1)$$

Equation 1 is also for determining a set of delta value ordinates and computation time ordinates where each delta value ordinate is the difference between a value from the first plurality of solutions and a value from the second plurality of solutions and where each delta computation time ordinate is the difference between an associated computation time from the first plurality of solutions and an associated computation time from the second plurality of solutions.

Summing delta ordinates and computing a centroid coordinate from the summation. Sometimes a centroid point is referred to as a center of gravity. Computing the centroid of all the points produced at the previous step can be expressed as a equation (2) (512):

$$\Delta T_{CC}, \Delta V_{CC} = \text{sum}(T(S_A) - T(S_B))/n, \text{sum}(V(S_A) - V(S_B))/n \quad (2)$$

Computing a centroid coordinate is the preferred embodiment example of summing individual comparisons to obtain representative ordinates. Another embodiment example of summing the ordinates is by adding them all together without dividing by n. The average delta value and the average delta computation time comprises a centroid calculation based in delta value and delta computation time space.

Determining which of anytime technique A or B is the most efficient from the summed delta ordinates (for example the centroid coordinate) (514). If summed delta ordinates are both positive or both negative then the technique responsible for all the positive ordinates is the most efficient or conversely the technique responsible for all the negative ordinates is the most efficient. If the delta ordinates summation are mixed positive and negative ordinates then the technique responsible for the delta ordinate with the largest magnitude after normalization can be determined as the most efficient. Alternatively a user policy is consulted to prioritize quality or speed. From the example of the preferred embodiments.

If $\Delta V_{CC} < 0$, then $A$ provides better quality values than $B$ \quad (3)

If $\Delta T_{CC} < 0$, then $A$ provides *its* best solution faster than $B$ \quad (4)

Conversely

If $\Delta V_{CC} > 0$, then $B$ provides better quality values than $A$ \quad (5)

If $\Delta T_{CC} > 0$, then $B$ provides *its* best solution faster than $A$ \quad (6)

In the preferred embodiment the method further comprises directing computing processing resource from two anytime techniques to a single determined most efficient anytime technique.

Displaying a scatter plot of the delta ordinates (optional) (516). Furthermore, the method further comprising accepting user input as to which anytime technique is the most efficient (optional). Step 518 is the end of anytime optimization method 500.

Referring to FIG. 6, an example of the preferred embodiment is described comprising a table of two runs, each run comprising ten ordinates. Anytime technique A has generated a run of ten ordinates T (S$_A$) and V (S$_A$) as indicated in the respective columns in the anytime technique A column. For example, the first ordinate has a time of 21 and a value of 88 and. In this example it can be seen that at the time T increases, the value V decreases. Anytime technique B has generated a run of ten ordinates T (S$_B$) and V (S$_B$) as indicated in the column for Anytime Technique B. The first anytime technique B ordinate is a time of 18.2 and a value of 91.1.

The deltas column holds the delta ordinates. The first delta ordinate is:

$$\text{Delta Time} = T(S_A) - T(S_B) = 21.0 - 18.2 = 2.8 \quad (7)$$

$$\text{Delta Value} = V(S_A) - V(S_B) = 88.0 - 91.1 = -3.1 \quad (8)$$

Other delta ordinates are calculated the same way. The centroid of the deltas is calculated as the sum of the deltas divided by the number (n) of deltas. Hence:

$$\Delta T_{CC} = \text{Sum}(T(S_A) - T(S_B))/n = (2.8 + 1.1 - 4.1 - 1.5 + 4.4 - 3.1 + 5.3 + 3.5 + 6.8 + 5.4)/10 = 2.68 \quad (9)$$

$$\Delta V_{CC} = \text{Sum}(V(S_A) - V(S_B))/n = (-3.1 - 0.6 - 0.7 - 1.7 + 3.6 + 2.7 - 3.2 - 2.4 - 3.8 - 0.1)/10 = -0.93 \quad (10)$$

The centroid coordinate in the example is a mix of positive and negative ordinates. In present example the centroid coordinate is considered normalized so that they can be compared. The dominant ordinate (largest magnitude number) is the time centroid ordinate at 2.68 and this is a positive so that anytime technique A is determined more efficient because it gives better solutions in the same time. The negative delta value indicates that B provides faster values.

Figure 7:
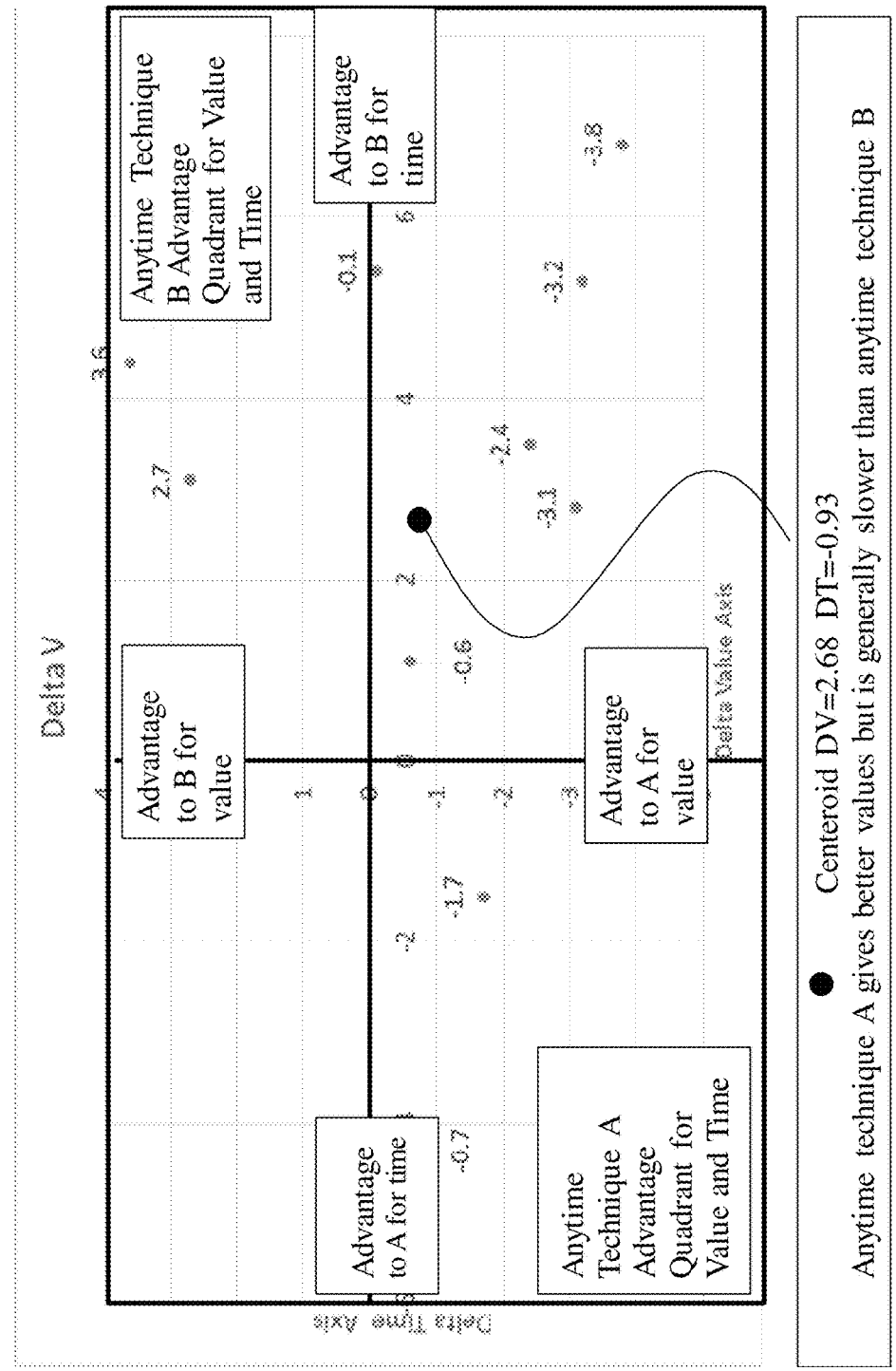
FIG. 7 is a scatter graph of the example, in accordance with an embodiment of the present invention.

Referring to FIG. 7, a scatter graph of the present embodiment is shown with the ten delta ordinates of the previous example plotted as well as the superposition of the delta centroid. $\Delta T_{CC} = 2.68$, $\Delta V_{CC} = -0.93$. Indicators used for choosing a more efficient anytime technique are used to label the scatter graph.

For centroid coordinates in the negative quadrant anytime technique A has the advantage for both value and time. For centroid coordinates in the positive quadrant, anytime technique B has the advantage for both value and time. For mixed centroid coordinates, a dominant positive value ordinate or a dominant positive time ordinate would indicate that anytime mechanism B is better for values or computation time. A dominant negative value ordinate or a dominant negative time ordinate would indicate that anytime technique A is the better for values or computation time.

Referring to FIG. 7, a scatter graph of the present embodiment is shown with the ten delta ordinates of the previous example plotted as well as the superposition of the delta centroid. $\Delta T_{CC}=2.68$, $\Delta V_{CC}=-0.93$. Indicators used for choosing a more efficient anytime technique are used to label the scatter graph.

For centroid coordinates in the negative quadrant anytime technique A has the advantage for both value and time. For centroid coordinates in the positive quadrant, anytime technique B has the advantage for both value and time. For mixed centroid coordinates, a dominant positive value ordinate or a dominant positive time ordinate would indicate that anytime mechanism B is better for values or computation time. A dominant negative value ordinate or a dominant negative time ordinate would indicate that anytime technique A is the better for values or computation time.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

Figure 8:
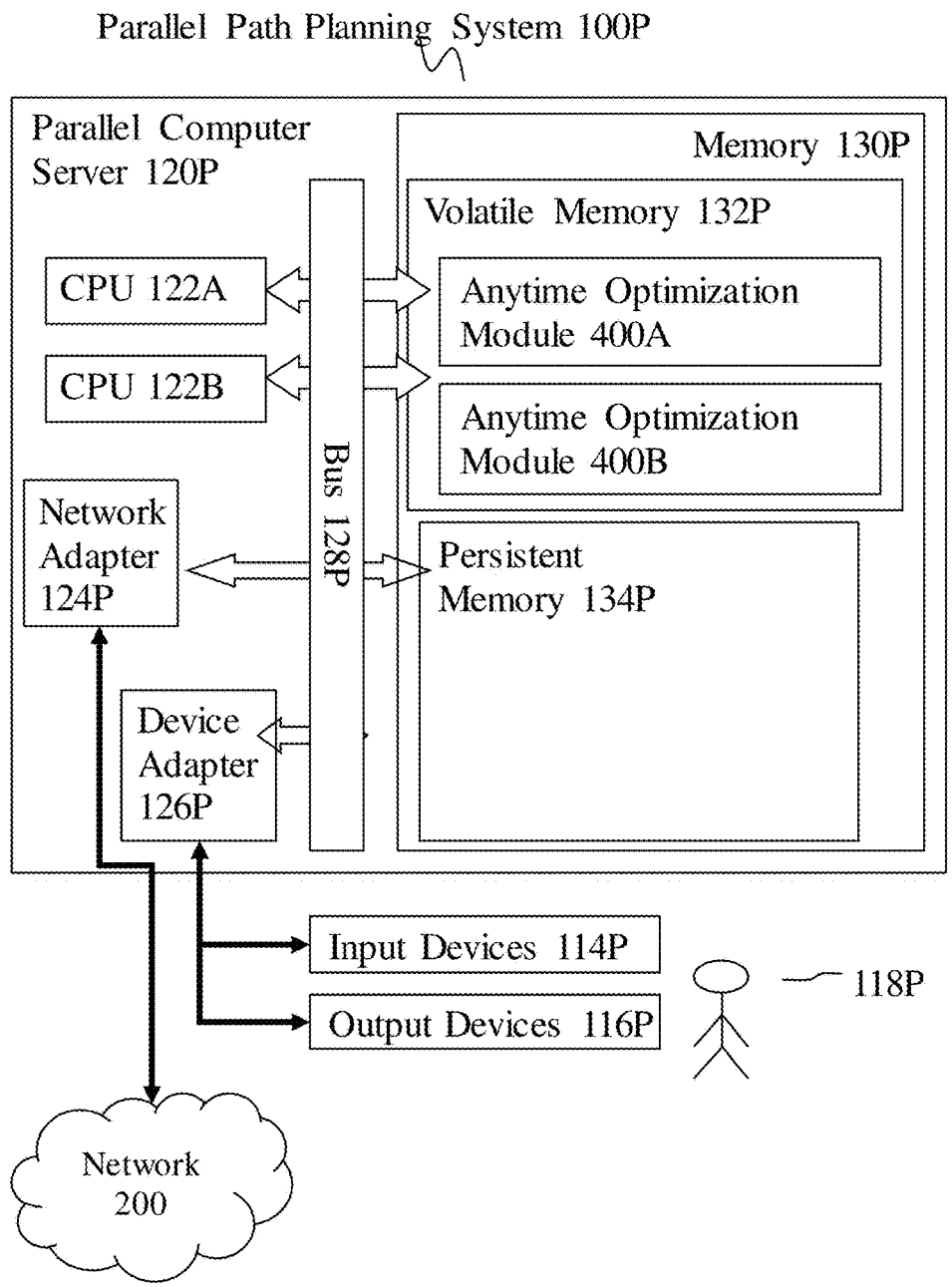
FIG. 8 is a deployment diagram of a parallel computing, in accordance with an embodiment of the present invention.

Referring to FIG. 8, an example parallel computing embodiment is described comprising parallel path planning system 100P for parallel processing of instructions. In other embodiments, the path planning system 100P may operate in a cloud computing environment, as depicted in FIGS. 9 and 10. Parallel path planning system 100P may be described in the general context of parallel computer system executable instructions, such as parallel program modules, being executed by parallel path planning system 100P. Generally, parallel program modules may include routines, programs, objects, components, logic, data structures, that perform particular tasks or implement particular abstract data types. Parallel path planning system 100P comprises: parallel computer server 120P; input devices 114P; and output devices 116P. Parallel computing system 100P communicates with user 118P via input devices 114P and output devices 116P. User 118P provides input and receives output from the parallel computing system 100P but is not part of parallel computing system 100P. Network 200 provides access to network attached devices and is not part of the parallel computing system 100P.

Parallel computer server 120P comprises: CPU 122A, CPU 122B; network adapter 124P; device adapter 126P; bus 128P and memory 130P.

Device adapter 126P provides the gateway between the parallel computer server 120P, input devices 114P and output devices 116P.

Bus 128P represents one or more of any of several types of bus structures, including a memory bus or memory controller, a peripheral bus, an accelerated graphics port, and a processor or local bus using any of a variety of bus architectures.

Memory 130P includes computer system readable media in the form of volatile memory 132P (such as random access memory and cache memory (not shown)) and in the form of non-volatile or persistent memory 134P.

In the parallel computing embodiment, program modules primarily comprise anytime optimization module 400A and anytime optimization module 400B (operating system module not shown). Modules are stored in persistent memory 134P, by way of example and not limitation, as well as an operating system, one or more application programs, a database management system and other program modules. Each of the operating system, one or more application programs, other program modules, and program data or some combination thereof, may include an implementation of a networking environment. Anytime optimization module 400A and anytime optimization module 400B are provided to carry out the functions and/or methodologies of the embodiments in a parallel environment as described herein.

Anytime optimization module 400A and anytime optimization module 400B are two autonomous parts of the embodiment. In operation, these two parts are extracted from persistent memory 134P and loaded into volatile memory 132P so that they may be executed separately and therefore in parallel by respective CPU 122A and CPU 122B. Essentially steps 504B and 506B (FIG. 5) are now performed in parallel with steps 504A and 506A (FIG. 5) but in a different processor. Once a number of solutions have been located for evaluation of anytime technique A or technique B then determination of which technique is more efficient is performed in one of the processor. Once an anytime technique is determined as more efficient then both processors can run that anytime technique.

In this example, two CPUs are shown but three or more CPUs can be used to build alternative parallel embodiments. In this example, two separate CPUs are used but a single processing unit having multiple cores could be used to build an alternative embodiment. In this example, the CPUs are physical CPUs but. In the described parallel computing embodiment the parallel computer server 120P comprises multiple processing units. In an alternative parallel computing embodiment, a parallel computer server comprises a single processor having multiple cores. In a first virtual parallel computing embodiment, a computer server comprises a virtual computing environment and virtual parallel processing units could be used to build a virtual parallel computing embodiment. A computer server comprises a virtual computing environment having a virtual processing unit with multiple virtual cores. Further embodiments can comprises combinations of: real processing units; real processing unit cores; virtual processing units; and virtual parallel processing cores.

A further embodiment of the invention is a computer program product defined in terms of a system and method. The computer program product may include a computer-readable storage medium (or media) having computer-readable program instructions thereon for causing a processor to carry out aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C and 54N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a path planning system 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of determining between two anytime techniques for solving an anytime problem, wherein the problem includes constraints and a value to be minimized, comprising:
   solving, by a computer, an anytime problem using a first anytime technique and a second anytime technique to determine a first and a second plurality of solutions, respectively, wherein each of the first and the second the plurality of solutions includes a value and an associated computation time, respectively, and each of the first and the second plurality solutions including a minimized value and associated computation time, respectively, wherein the first plurality of solutions determined by the first anytime technique produces different solutions than the second plurality of solutions determined by the second anytime technique;
   determining, by the computer, a set of delta value ordinates and computation time ordinates where each delta value ordinate is the difference between a value from the first plurality of solutions and a value from the second plurality of solutions and where each delta computation time ordinate is the difference between an associated computation time from the first plurality of solutions and an associated computation time from the second plurality of solutions;
   determining, by the computer, a representative value ordinate and representative computation time ordinate from a summation of the respective delta value ordinates and a summation of the computation time ordinates, wherein the representative value ordinate and the representative computation time ordinate comprises a centroid calculation in value and computation time space, wherein the centroid calculation comprises summing the delta value ordinates divided by the number of delta value ordinates;
   determining, by the computer, a more efficient anytime technique from the sign of the representative value ordinate and the computation time ordinate; and
   solving, by the computer, the anytime problem using the more efficient anytime technique to determine a travel path to be executed by a robot, wherein the robot executes the determined travel path.

2. The method according to claim 1 wherein when the representative value ordinate and the representative computation time ordinate are both positive or both negative then the technique responsible for the positive or negative result is taken to be the most efficient.

3. The method according to claim 1 wherein when the representative value ordinate and the representative computation time ordinate are mixed positive and negative then the technique responsible for the largest magnitude of a normalized representative value ordinate and the representative computation time ordinate is determined to be the most efficient.

4. The method according to claim 1 further comprises:
   displaying, by the computer, a scatter plot of the first and second runs of values and computation time and displaying the representative value ordinate and representative computation time ordinate and/or an indication of the determined more efficient anytime technique.

5. The method according to claim 4 further comprises:
   accepting, by the computer, an user input as to which anytime technique is the most efficient.

6. A non-transitory computer system for determining which anytime technique is the most efficient at solving a problem, the computer system comprising:
   one or more computer processors, one or more computer-readable storage media, and program instructions stored on one or more of the computer-readable storage media for execution by at least one of the one or more processors, the program instructions comprising:
   an anytime time engine for solving a anytime problem using a first anytime technique and a second anytime technique to determine a first and a second plurality of solutions, respectively, wherein each of the first and the second the plurality of solutions includes a value and an associated computation time, respectively, and each of the first and the second plurality solutions including a minimized value and associated computation time, respectively, wherein the first plurality of solutions determined by the first anytime technique produces different solutions than the second plurality of solutions determined by the second anytime technique;

a centroid engine for determining a set of delta value ordinates and computation time ordinates where each delta value ordinate is the difference between a value from the first plurality of solutions and a value from the second plurality of solutions and where each delta computation time ordinate is the difference between an associated computation time from the first plurality of solutions and an associated computation time from the second plurality of solutions and for determining a representative value ordinate and computation time ordinate from a summation of the respective delta value ordinates and respective computation time ordinates, wherein the representative value ordinate and the representative computation time ordinate comprises a centroid calculation in value and computation time space, wherein the centroid calculation comprises summing the delta value ordinates divided by the number of delta value ordinates;

a technique decision engine for determining a more efficient anytime technique from the sign of the representative value ordinate and representative computation time ordinate; and the anytime time engine for solving the anytime problem using the more efficient anytime technique to determine a travel path to be executed by a robot, wherein the robot executes the determined travel path.

7. The non-transitory computer system according to claim 6 wherein when the representative value ordinate and the representative computation time ordinate are both positive or both negative then the technique responsible for the positive or negative result is taken to be the most efficient.

8. The non-transitory computer system according to claim 6 wherein when the representative value ordinate and the representative computation time ordinate are mixed positive and negative then the technique responsible for the largest magnitude of the normalized representative value ordinate and the normalized representative computation time ordinate is determined to be the most efficient.

9. The non-transitory computer system according to claim 6 further comprising further comprising displaying a scatter plot of the first and second runs of values and computation time and optionally displaying the representative value and associated representative computation time and/or an indication of the determined more efficient anytime algorithm.

10. The non-transitory computer system according to claim 9 further comprising accepting user input as to which anytime technique is the most efficient.

11. A computer program product for determining which anytime technique is the most efficient at solving a problem, wherein the problem includes constraints and a value to be minimized, the computer program product comprising:

one or more non-transitory computer-readable storage media and program instructions stored on the one or more non-transitory computer-readable storage media, the program instructions comprising:

solving a problem using a first anytime technique and a second anytime technique to determine a first and a second plurality of solutions, respectively, wherein each of the first and the second the plurality of solutions includes a value and an associated computation time, respectively, and each of the first and the second plurality solutions including a minimized value and associated computation time, respectively, wherein the first plurality of solutions determined by the first anytime technique produces different solutions than the second plurality of solutions determined by the second anytime technique;

determining a set of delta value ordinates and computation time ordinates where each delta value ordinate is the difference between a value from the first plurality of solutions and a value from the second plurality of solutions and where each delta computation time ordinate is the difference between an associated computation time from the first plurality of solutions and an associated computation time from the second plurality of solutions;

determining a representative value ordinate and representative computation time ordinate from a summation of the respective delta value ordinates and computation time ordinates, wherein the representative value ordinate and the representative computation time ordinate comprises a centroid calculation in value and computation time space, wherein the centroid calculation comprises summing the delta value ordinates divided by the number of delta value ordinates;

determining a more efficient anytime technique from the sign of the representative value ordinate and representative computation time ordinate; and solving the anytime problem using the more efficient anytime technique to determine a travel path to be executed by a robot, wherein the robot executes the determined travel path.

* * * * *